US008347291B2

(12) United States Patent
Marwinski

(10) Patent No.: US 8,347,291 B2
(45) Date of Patent: Jan. 1, 2013

(54) ENTERPRISE SCHEDULER FOR JOBS PERFORMABLE ON THE REMOTE SYSTEM BY RECEIVING USER SPECIFIED VALUES FOR RETRIEVED JOB DEFINITIONS COMPRISING METADATA REPRESENTATION OF PROPERTIES OF JOBS

(75) Inventor: Dirk S. Marwinski, Heidelberg (DE)

(73) Assignee: SAP AG, Walldorf (DE)

( * ) Notice: Subject to any disclaimer, the term of this patent is extended or adjusted under 35 U.S.C. 154(b) by 1165 days.

(21) Appl. No.: 11/647,962

(22) Filed: Dec. 29, 2006

(65) Prior Publication Data
US 2008/0163219 A1 Jul. 3, 2008

(51) Int. Cl.
G06F 9/46 (2006.01)
(52) U.S. Cl. .................. 718/101; 718/100; 718/102
(58) Field of Classification Search .......... 718/100, 718/101, 102; 709/220
See application file for complete search history.

(56) References Cited

U.S. PATENT DOCUMENTS

| | | | | |
|---|---|---|---|---|
| 6,219,701 B1 * | 4/2001 | Hirata et al. | ............... | 709/223 |
| 6,438,553 B1 * | 8/2002 | Yamada | ................. | 1/1 |
| 6,463,457 B1 * | 10/2002 | Armentrout et al. | ........ | 709/201 |
| 6,571,147 B1 * | 5/2003 | Kashihara | .................. | 700/100 |
| 6,694,345 B1 * | 2/2004 | Brelsford et al. | ............ | 718/100 |
| 6,988,139 B1 * | 1/2006 | Jervis et al. | .................. | 709/226 |
| 7,155,498 B1 * | 12/2006 | Hirata et al. | ................. | 709/223 |
| 7,197,700 B2 * | 3/2007 | Honda et al. | ................. | 715/207 |
| 7,243,352 B2 * | 7/2007 | Mandava et al. | ............. | 718/104 |
| 7,386,586 B1 * | 6/2008 | Headley et al. | ............... | 709/202 |
| 7,415,716 B2 * | 8/2008 | Marin et al. | .................. | 719/330 |
| 7,619,761 B2 * | 11/2009 | Bankston et al. | ............ | 358/1.14 |
| 7,680,970 B2 * | 3/2010 | Sherriff et al. | ............... | 710/240 |
| 2003/0028645 A1 * | 2/2003 | Romagnoli | .................. | 709/226 |
| 2003/0120708 A1 * | 6/2003 | Pulsipher et al. | ............ | 709/106 |
| 2006/0017969 A1 * | 1/2006 | Ly et al. | ..................... | 358/1.15 |
| 2006/0184945 A1 | 8/2006 | Murase et al. | | |
| 2006/0259908 A1 * | 11/2006 | Bayer | .......................... | 718/107 |
| 2009/0024997 A1 * | 1/2009 | Kobayashi | ................... | 718/101 |

FOREIGN PATENT DOCUMENTS

AU 2004222721 11/2004
GB 2355319 A * 4/2001

OTHER PUBLICATIONS

Sims, David , et al., "Job Scheduling in J2EEE Applications", XP002474820, Retrieved from: .theserverside.com/tt/articles/article.tss?1=Job-Scheduling-In-J2EEE-Applications>, retrieved on Apr. 2, 2008., (2000), 1-6.
PCT Search Report mailed May 2, 2008, 4 Pages.
Written Opinion mailed May 2, 2008, 7 Pages.

* cited by examiner

Primary Examiner — Meng An
Assistant Examiner — Abu Z Ghaffari
(74) Attorney, Agent, or Firm — Schwegman Lundberg Woessner P.A.

(57) ABSTRACT

A system and method for interaction with a remote server is described. Using an enterprise scheduler, jobs and other tasks may be scheduled on a remote server. Typically, the enterprise scheduler and remote server communicate through an API which serves as an interpreter between them. A Java API is used when the remote server utilizes Java technology.

17 Claims, 13 Drawing Sheets

ENTERPRISE SCHEDULER FOR JOBS PERFORMABLE ON THE REMOTE SYSTEM BY RECEIVING USER SPECIFIED VALUES FOR RETRIEVED JOB DEFINITIONS COMPRISING METADATA REPRESENTATION OF PROPERTIES OF JOBS

FIELD OF INVENTION

The field of invention relates generally to the software arts, and, more specifically, to remotely or locally maintain, schedule, and process tasks or jobs.

BACKGROUND

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Mozilla Firefox®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 2 illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 2, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Object-Oriented Computer Systems

The computer systems described above consist of many smaller pieces of program code referred to as "objects" which interact with each other. For example in a computer program for booking cars at least three objects are required for storing the relevant information: one for the person who makes the booking (name, credit card number etc), one for the booked car (model, engine, class, etc) and another for the booking itself (booking date, return date, etc).

Enterprise computer systems (and to a lesser extent smaller computer systems) utilize task or job scheduling to take advantage of the available processing power without the intervention of a person to start these tasks. For example, instead of having an administrator physically start a file backup program for users on a network at 2 AM (when, presumably, the users on the network will not be on the network), the backup program may be scheduled to automatically run at 2 AM without any further intervention.

FIG. 3 illustrates an example of a prior art system for remote scheduling. Computer clusters or systems at a different physical location 303 1, 305 5, and 307 1 may make up an overall enterprise system (for example, a banking system). Cluster 303 1 could provide banking information in New York and cluster 307 1 in San Francisco. Computers in each of these clusters 303 1, 305 5, and 307 1 generally have the ability to be scheduled to execute programs or tasks at predetermined times.

Additionally, background tasks in these clusters 303 1, 305 5, and 307 1 may be remotely scheduled, if the computers and systems of the clusters have an interface to the central scheduler 301. In other words, the central scheduler 301 is specific to the particular systems and/or software platforms that it supports and cannot be used with other platforms.

BRIEF DESCRIPTION OF THE FIGURES

The present invention is illustrated by way of example, and not limitation, in the figures of the accompanying drawings in which like references indicate similar elements and in which.

SUMMARY

A system and method for interaction with a batch processing system, such as a remote server, is described. Using an enterprise scheduler, jobs and other tasks may be scheduled on a remote server. Typically, the enterprise scheduler and remote server communicate through an API which serves as an interpreter between them. A Java API is used to when the remote server utilizes Java technology.

DETAILED DESCRIPTION

As described earlier, prior art systems rely on the central scheduler to have an interface to all systems and software platforms that it triggers remote execution of jobs for. In prior art systems, there are interfaces available for Java systems for remote execution of jobs by a central scheduler however these solutions have several shortcomings, for example, they are specific to a particular central scheduler system 301 from a specific vendor and do not take the landscape of the Java system into consideration. The enterprise scheduling system described below overcomes these shortcomings and more.

Figure 1A:
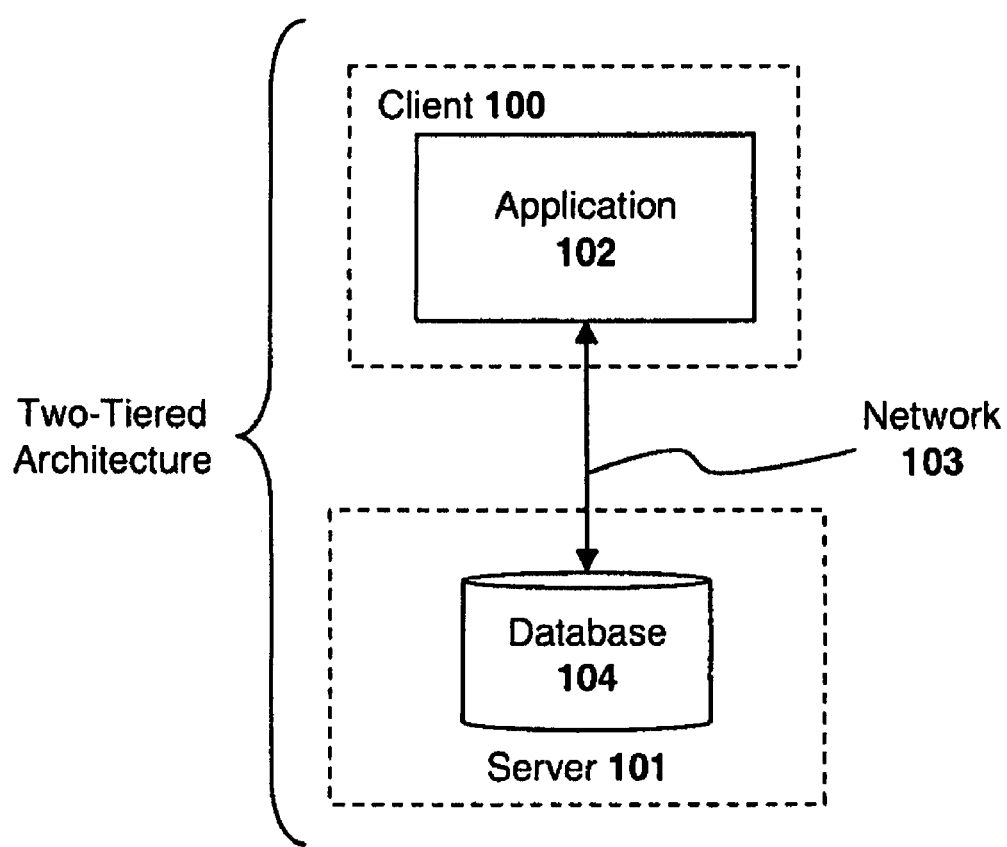
FIG. 1a illustrates a traditional two-tier client-server architecture.
Figure 1B:
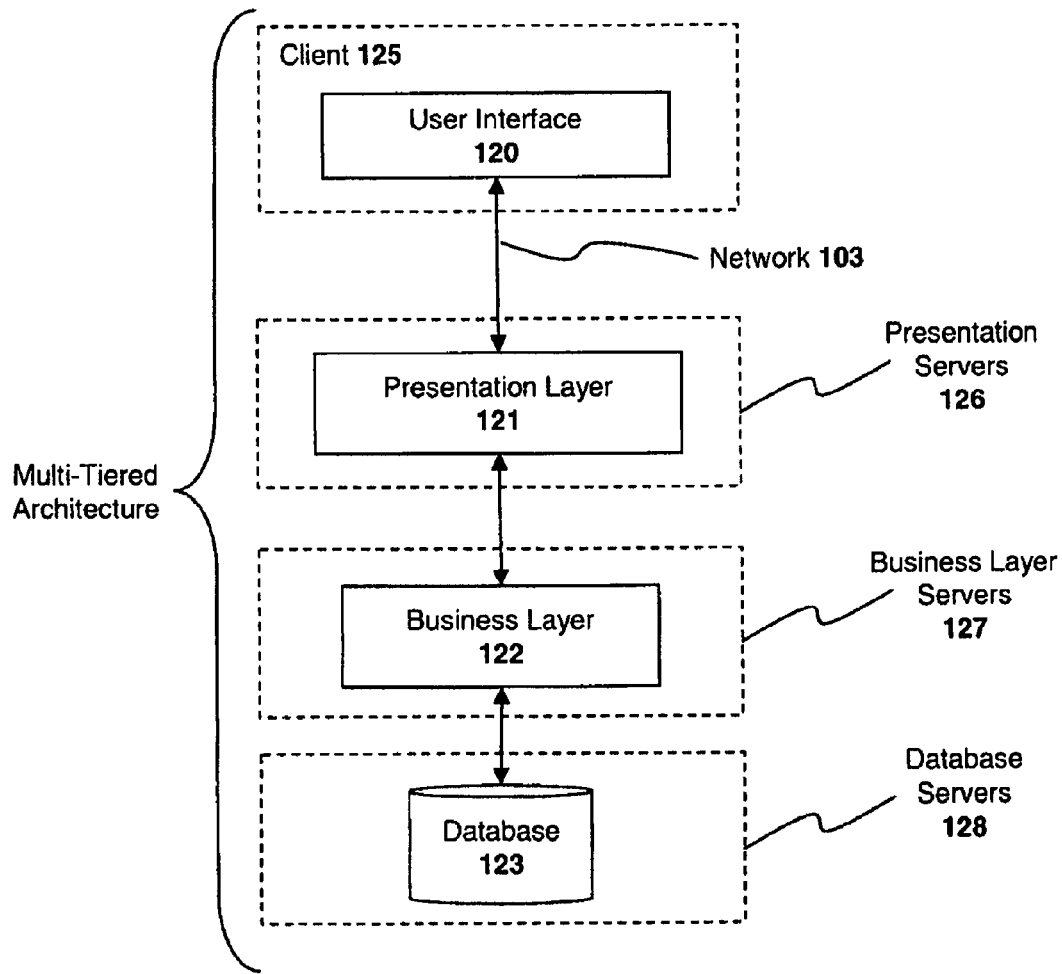
FIG. 1b illustrates a prior art multi-tier client-server architecture.
Figure 2:
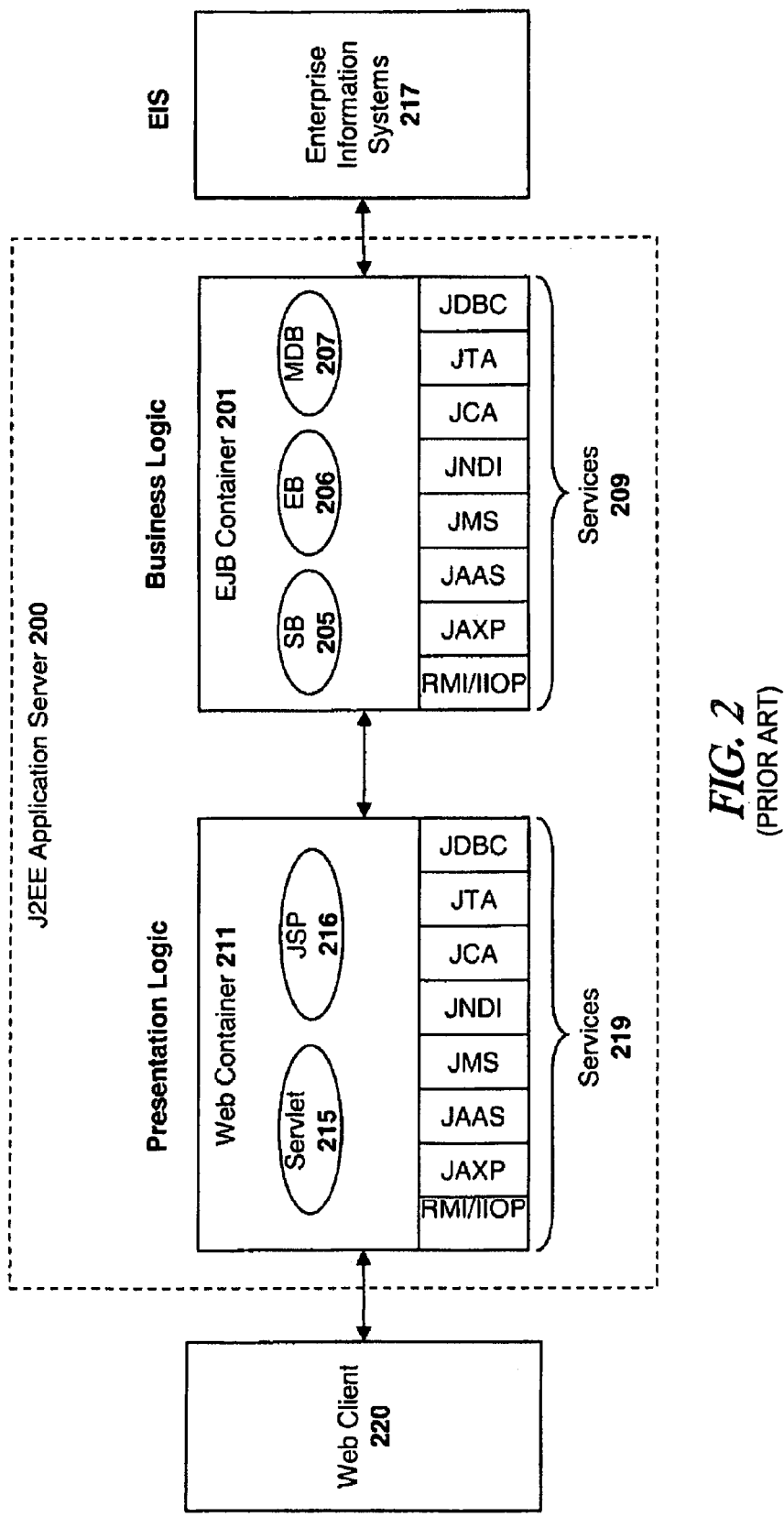
FIG. 2 illustrates a multi-tiered application server architecture according to the Java 2 Enterprise Edition ("J2EE") standard.
Figure 3:
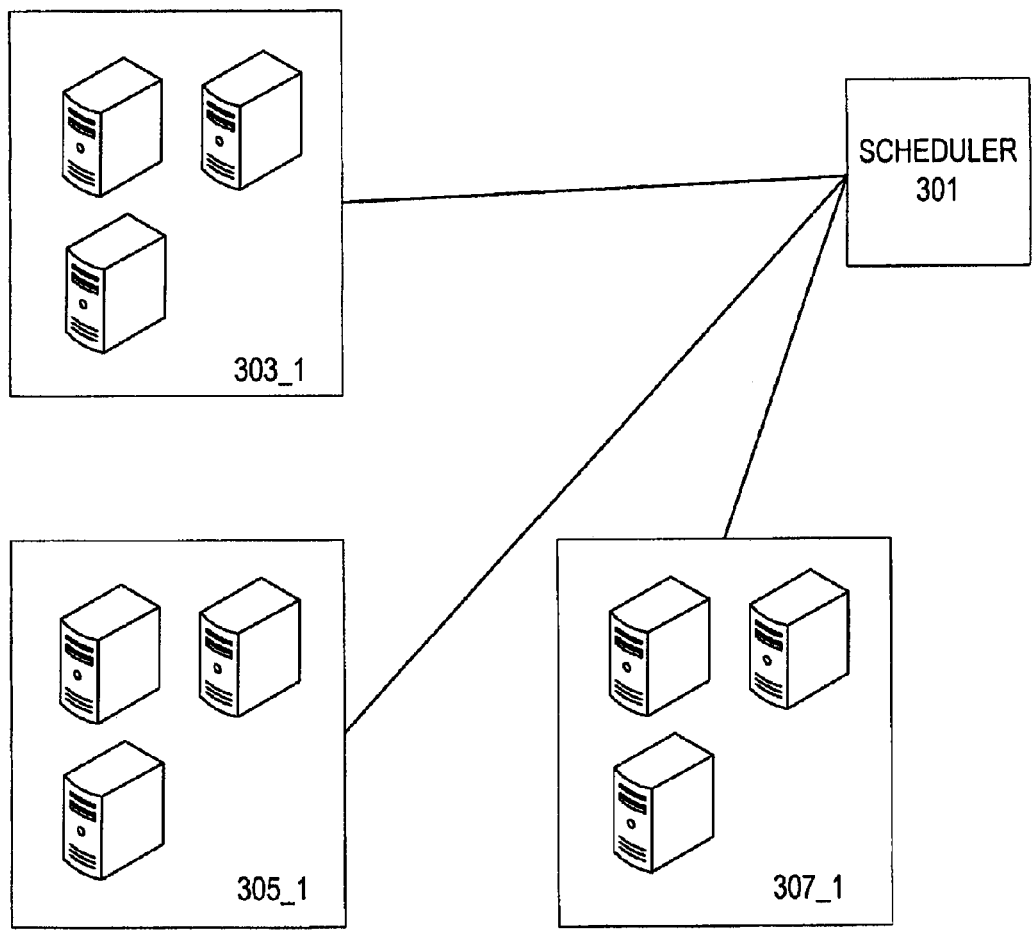
FIG. 3 illustrates a prior art scheduling system.
Figure 4:
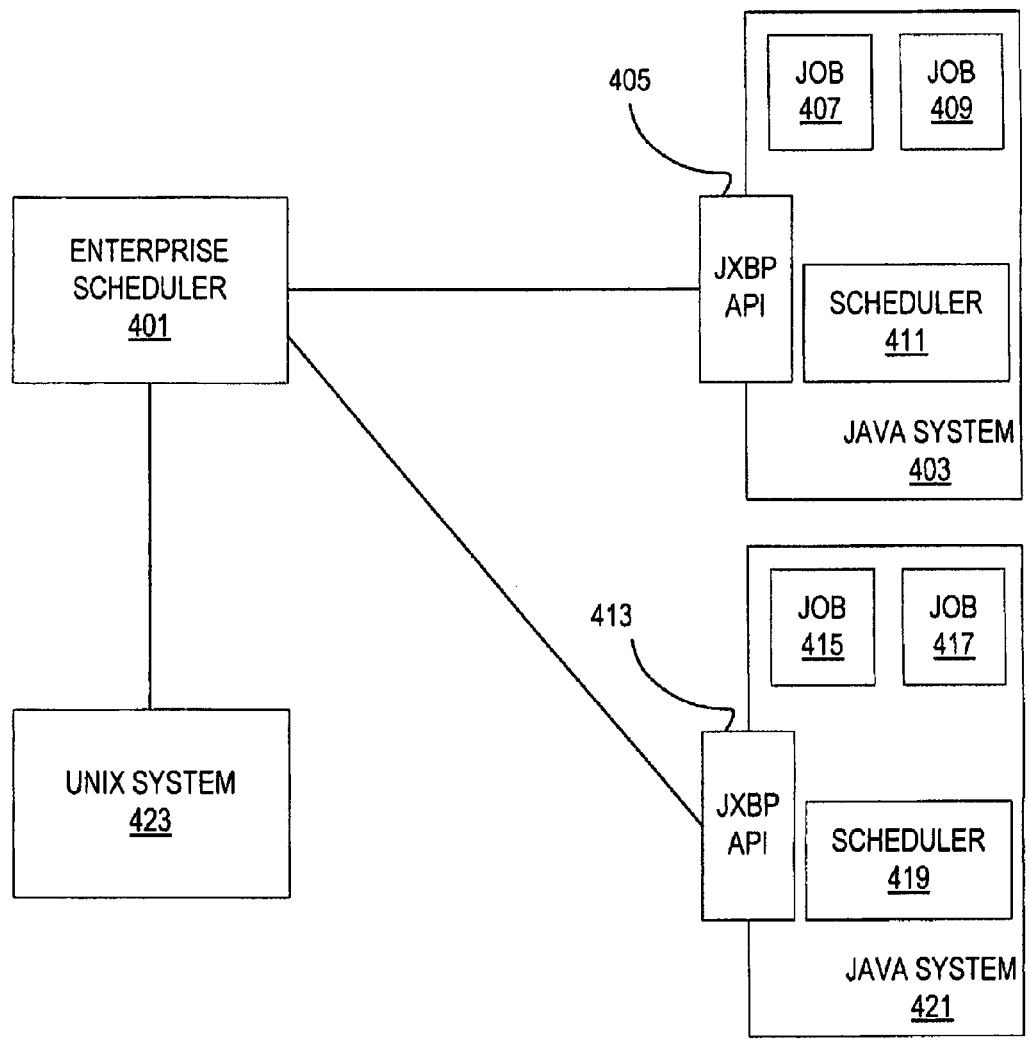
FIG. 4 illustrates an embodiment of an enterprise scheduling system.

FIG. 4 illustrates an embodiment of an enterprise scheduling system. An enterprise scheduler 401 schedules jobs to run and other tasks on several different remote systems that use different operating systems and/or software platforms. This is possible, in part, due to the use of one or more Application Programming Interfaces (APIs) 405, 413 that interpret the commands of the enterprise scheduler 401 into commands that the remote servers 403, 421, 423 understand. For example, the enterprise scheduler 401 may schedule jobs on a remote Java platform 403, 421 or a UNIX system 423 because one or more APIs "convert" the commands of the enterprise scheduler 401 into platform or server specific commands.

The enterprise scheduler 401 described works with different operating systems. For example, Java system 403 could run Microsoft Windows and Java system 421 could run Linux and both could be scheduled by the enterprise scheduler 401.

Through the Java API illustrated in FIG. 4, the enterprise scheduler 401 communicates with a Java system (remote server) to perform a variety of functions. These functions include, but are not limited to: scheduling a job on a remote server, discovering the job definitions available on a remote server, discovering the status of the jobs on a remote server, scheduling maintenance tasks on the remote server; etc. A portion of these functions are described with respect to an exemplary interface illustrated in FIG. 5. Of course it should be understood that any of the functionality provided through the interface may also be provided through command line prompts or scripting.

A remote system, such as Java system 403 or 421, performs one or more "jobs" 407, 409 locally. Exemplary jobs include, but are not limited to: removing outdated or irrelevant job instance information from the system ("CleanJob"), generating reports at certain points in time (e.g. daily sales reports), triggering daily backup jobs, retrieving monitoring information from remote systems at a regular basis, etc. Jobs are also objects in the Java 403, 421 or UNIX 423 system. In an embodiment, each job runs only once regardless of how successful or unsuccessful the job is. For example, a new job (and new job ID) is created if the job is restarted.

A job (sometimes referred to as a job instance) is a concrete instance of a job definition. (Job definitions are also objects in the system.) Job definitions are abstract meta representations of tasks performable by the remote system. For example, a job definition defines the parameters that a particular job requires to execute. In an embodiment, job definitions originate from a deployment descriptor (such as an EJB deployment descriptor) and job definition file found in a deployment archive. The job definition class may be Extensible Markup Language (XML) serializable/deserializable for ease of transport across a network (for example, from the Java system 403 to the enterprise scheduler 401). Accordingly, jobs have these properties but with concrete values. Job definitions are stored remotely in storage areas and/or locally at the enterprise scheduler 401.

A job definition has one or more of the following properties: an ID, a name, a description of the job to be performed, parameters, retention period (the period for which logs of individual job instances are kept), and a type that identifies the job definition type (for example, MDB job or EJB job). The retention period may be specified in days where −1 days means that no information for this job is kept after it has finished execution. Job definitions may also be created or deployed onto a remote system as it is running. A job, therefore, has concrete values for these properties. A job may also have vendor data associated with it. Typically, this vendor data is related to the internal state of the central scheduler which scheduled the job. This can be used to associate the vendor specific job id with the job id in the remote system.

Jobs have statuses associated with them. Exemplary statuses include, but are not limited to: cancelled, completed, error, running, starting, unknown. A completed job is one that has finished. An error means that the job has completed but had a problem or failed completely. A running job is currently executing. A starting job is one that is currently being started by the runtime. A cancelled job is one that was running or starting but was stopped. Job statuses are maintained remotely and may also be mirrored or at the enterprise scheduler 401.

Jobs have a log file associated with them. These log files may be used to determine if the job executed correctly or if it didn't what the problem was.

Jobs may be scheduled locally with internal scheduler 411, 419 or scheduled using the enterprise scheduler 401. In one embodiment, the enterprise scheduler 401 schedules jobs in the remote system 403, 421 using the internal scheduler 411, 419. The API 405 transforms the commands of the enterprise scheduler 401 into commands that the internal scheduler 411, 419 understands. In other words, the API 405 acts as a translator between the enterprise scheduler 401 and the Java system 403, 421. Of course, the API may be deployed on the enterprise scheduler 401 instead of on the remote servers.

In systems where the enterprise scheduler 401 and internal scheduler 411,419 coexist, that is where each may schedule, a priority system may be employed to determine which scheduler has priority in making scheduling decisions. For example, the enterprise scheduler 401 may be given higher priority (and therefore overrides the internal scheduler 411, 419) or lower priority (and does not override the internal scheduler 411,419) depending upon the needs of the enterprise at a given point in time.

The internal scheduler 411,419 is controlled by the enterprise scheduler 401 in other embodiments. In this configuration, the enterprise scheduler 401 is directly responsible for maintaining job schedules for each remote system.

Java system 421 operates in the same manner to Java system 403. Due to the difference between application server and operating systems, the UNIX system 423 may have different components to the Java systems.

Figure 5:
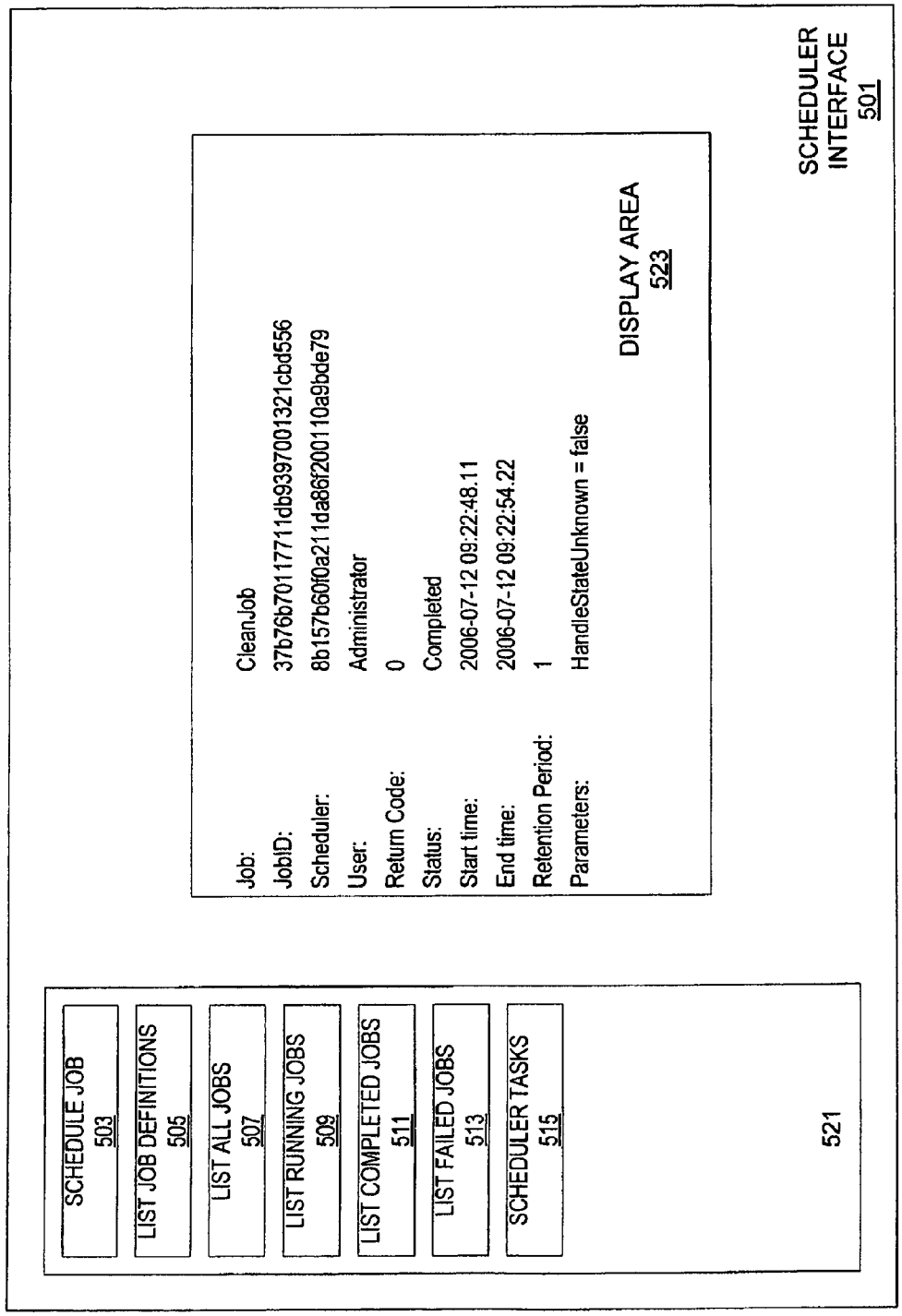
FIG. 5 illustrates an embodiment of an interface for an enterprise scheduling system.

FIG. 5 illustrates an embodiment of an interface for an enterprise scheduling system. Through the description of this interface the basic functionality of scheduling using an enterprise scheduler through an API (such as API 405) or scheduling locally on a remote server will be explained. Using this, or an interface similar to this, the jobs, job definitions, etc. of a remote system may be maintained, scheduled, etc. The illustrated interface 501 is part of the enterprise scheduler system. A similar interface could be deployed on the remote system. In this case, only those job definitions known to the remote system could be scheduled. If provided on a central enterprise scheduler 401, jobs can be scheduled in multiple remote systems 405, 413, and 423. The interface 501 includes one or more links to functions or routines that provide job, job definition, or task maintenance on a remote server. As illustrated, the scheduler interface 501 may include a navigation menu 521 that includes these links.

The interface 501 may also include a display area 523 to display relevant information for a particular function. For example, when scheduling a job the display area 523 may display input fields to be filled in to create a job instance using the requirements of the relevant job description (job definition). In the exemplary display area shown in FIG. 5 information about a particular job is provided. For this particular example, the job run was a "CleanJob" job. The information about this particular CleanJob job (there could be more than one instance of CleanJob scheduled) includes the job name, job ID, scheduler ID, the user that created the job instance, the status of the job, start and end times, and the retention period for the log associated with the job.

While the information provided above is sufficient for the described Java system, the information provided for another system such as a UNIX system may be of a slightly different nature depending on the scheduling approach taken (not described here).

In most cases, an enterprise scheduler must be registered with the remote system prior to the enterprise scheduler being allowed to schedule jobs. For example, enterprise scheduler 401 would be registered with Java system 403 prior to any scheduling by enterprise scheduler 401. The enterprise scheduler is registered at the remote system by a configuration mechanism provided by the remote system. This may include but is not limited to a configuration file, or a graphical user interface. Typical information used to register/add an enterprise scheduler includes a unique name for the scheduler, a description of the enterprise scheduler, and/or a listing of events in which the enterprise scheduler is interested. Most actions performed by the scheduler or remote system raise events. Exemplary events include, but are not limited to: a job starting, a job finishing, a job being cancelled, a job being removed or deleted, a new job definition being deployed, a job definition being updated, a job definition being undeployed, etc.

Additionally, in most cases information associated with the user that added the enterprise scheduler is retained. For example, a user's name may be retained so as to ensure that only qualified users are adding enterprise schedulers.

The remote system may or may not offer functionality in order to list which external schedulers are allowed to trigger jobs on the system. The list may be filtered by name, ID, description, user, etc. to display only certain registered enterprise schedulers.

Jobs are scheduled through link 503. As described above, a job definition provides the abstract properties for a job instance. In essence, a job definition is a template that when filled in creates a job instance. Through the link 503, a job may be scheduled if the information required by the relevant job description is provided. For example, the remote system identifier, a name for the job, the job's input parameters (start time, etc.), retention period (the period for which logs of individual job instances are kept), etc. may be used to create a job. As described above, once the job instance is created it is given a unique ID. Typically, jobs, job definitions, logs, etc. are stored in an array(s) or array-like structure(s) (not shown).

A refreshable display in the display area 523 may be used for one or more of the input parameters of a job definition during the creation or revision of a job instance, or, the display area 523 may have input areas for the creation of a job instance without the need to refresh for different needed parameters. Additionally, drop down lists of available job definitions may be provided for the user to select which job to create. Scheduling a job may also include modifying an existing job that is scheduled. For example, changing the start time of a scheduled job or changing other parameters of the scheduled job may be allowed.

During scheduling, it is important that the local time of the remote server be taken into account. It is not uncommon for the enterprise scheduler to be in a different time zone than the remote server. For example, scheduling a resource intensive job to run on a remote server in New York at 10 PM Munich local time would tie up the resources at the remote server during the middle of the day (presumably when those resources would be used for other, more time critical purposes).

A listing of job definitions available on the remote server is accessible through link 505. The listing may include all jobs or be a filtered list. Job definitions are filterable by ID, name, description, or any combination of ID, name, or description. A listing of job definitions may be specific to the external scheduler.

The jobs scheduled on remote servers are listable using link 507. Individual jobs may be retrieved by remote system identifier and any combination of ID, name, start time, end time, status, vendor data, or return code. A complete listing of all jobs is also possible. However, these listings may be extremely large, and in one embodiment, these listings are iterated in chunks. In other words, only a portion or block of the jobs is retrieved at a time. When the first portion has been retrieved, the next block may be retrieved. Processing the array(s) in this manner uses fewer resources and is less susceptible to a memory leak or crash. Depending upon the needs of the system, the block size may be user definable, set by an administrator, or hard coded during deployment.

Of course, the listing of jobs may be further filtered by job status. For example, a list running jobs link 509 provides a list of jobs that have the status of "running;" the list completed jobs link 511 provides a list of jobs that have completed; and the list failed jobs link 513 provides a list of jobs that have failed; etc.

The interface 501 also provides for accessing, planning, or executing scheduler tasks through link 515.

Not shown, but may be provided, are functionalities for one or more of the following: removing an enterprise scheduler; removing, editing, or adding job definitions (a job definition may not be edited or removed if a job using that job definition is scheduled; retrieving job logs; removing job logs; etc.

Figure 6:
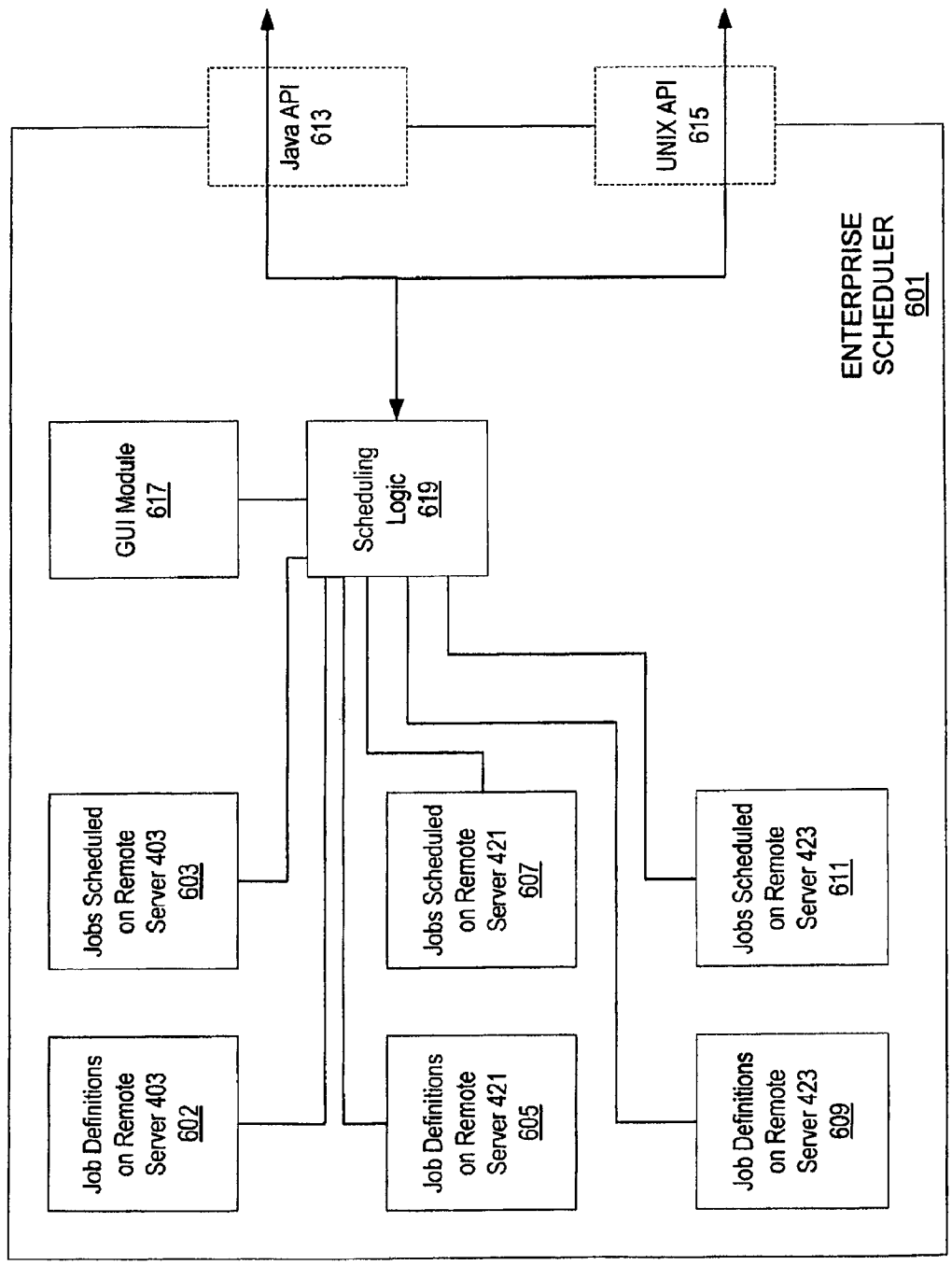
FIG. 6 illustrates an embodiment of an enterprise scheduler.

FIG. 6 illustrates an embodiment of an enterprise scheduler. Enterprise scheduler 601 may be used as enterprise scheduler 401, however, other enterprise schedulers may also be used as enterprise scheduler 401. The illustrated enterprise scheduler includes scheduling logic 619 that contains the functionality/routines for scheduling a job on a remote server, retrieving the job definitions available on a remote server, retrieving the jobs scheduled on a remote server, retrieving the status of the jobs on a remote server, scheduling maintenance tasks on the remote server; etc. Of course, the scheduling logic 619 may consist of one or more sub-components dedicated to these functions. Alternatively, the components dedicated to these functions may be separately used and not part of a larger scheduling logic.

The scheduling logic 619 interfaces with one or more modules. If the scheduler provides a graphical user interface or "GUI" (such as interface 501) the scheduling logic interfaces with a GUI module 617. Through the interaction between the GUI module 617 and the scheduling logic, commands for scheduling a job, retrieving job definitions, etc. are created for transmission to a remote server. For example, the GUI module 617 may provide input fields for the reception of concrete values for a job definition from a user. These values and other information about the job definition chosen are then transmitted to a remote server.

Job definitions are associated with the scheduler 601. As illustrated, the scheduler 601 has separate job definition listings 602, 605, 609 for each remote server that it communicates with. In an alternative embodiment, the scheduler 601 has one listing but in each of the entries of the listing is a field for the identification of the remote server that each job definition is associated with. The scheduling logic 619 reads the job definitions as necessary as a template for the creation of a scheduled job, editing of a scheduled job, etc.

Jobs that have been scheduled by the enterprise scheduler 601 are also associated with the scheduler 601. As illustrated, the scheduler 601 has separate job listings 603, 607, 611 for each remote server that in communicates with. In an alternative embodiment, the scheduler 601 has one listing but in each of the entries of the listing is a field for the identification of the remote server that each job is associated with. The scheduling logic 619 reads the jobs as necessary for providing a user with job specific information. Using that information, a user may request the scheduling logic 619 communicate with the remote server to perform a variety of tasks such as stopping a job from starting, etc. In another embodiment, enterprise scheduler 601 leaves the job list on the remote system and only retrieves the job list by user request though the GUI Module 617. Job definition listings and job listings may be stored in any type of storage type including, but not limited to: hard disk, optical disk, volatile memory, etc.

Additionally, an enterprise scheduler 601 may also have an API 613, 615 associated with each type of server (or even per specific server) that it communicates with. However, if the remote server already has an API on its end, the enterprise scheduler 601 may not need to have or use these APIs.

Figure 7:
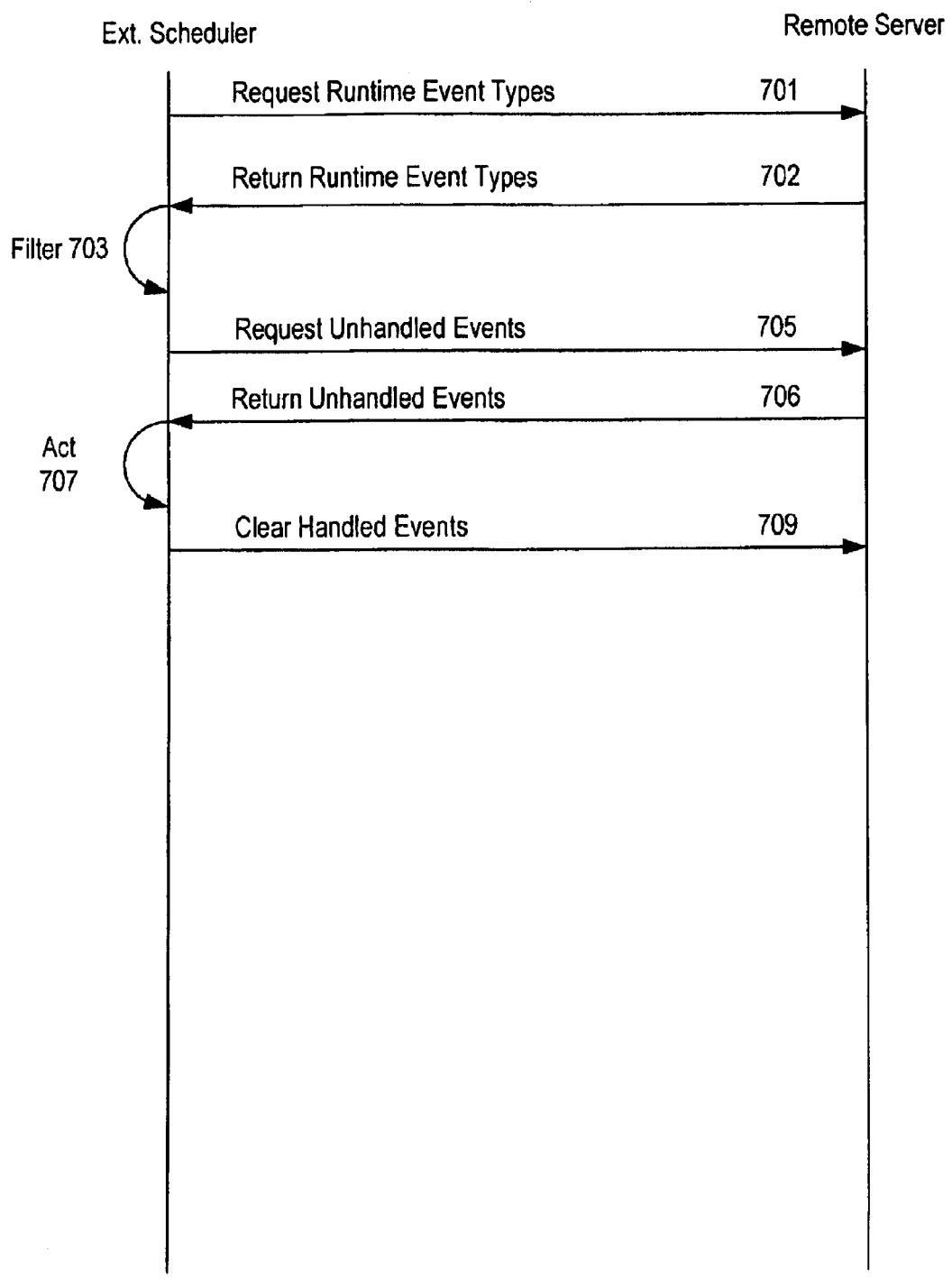
FIG. 7 illustrates an embodiment of a flow for an enterprise scheduler managing events that have occurred at a remote server.

FIG. 7 illustrates an embodiment of a flow for an enterprise scheduler managing events that have occurred at a remote server. As described earlier, exemplary events include, but are not limited to: a job starting, a job finishing, a job being cancelled, a job being removed or deleted, a new job definition being deployed, a job definition being updated, a job definition being undeployed, etc. The external scheduler requests the runtime event types from the remote server at 701. The remote server returns the event types that it supports at 702.

A filter may be applied to the returned event types at 703. Generally filtering is done by the name or string associated with an event type and/or scheduler. Filtering what event types are to be managed by the external scheduler helps reduce the amount of traffic between the scheduler and remote server, thereby decreasing the bandwidth and resources used.

The external scheduler requests the unhandled events from the remote server that the external scheduler is interested in (what has not been filtered out) at 705. Information about one or more of these unhandled events such as deployment (new job definitions added), alterations (job definitions changing), removal, etc. is received by the external scheduler at 706.

The external scheduler may act on these unhandled events at 707. For example, the external scheduler may add, edit, or remove a job definition that it has stored. Upon receiving and/or acting on the receiving unhandled events, the external scheduler sends a command to the remote server at 709 to clear the unhandled events that it sent earlier at 706. At some point later in time, the external scheduler may repeat one or more of the above actions to manage new unhandled events.

Figure 8:
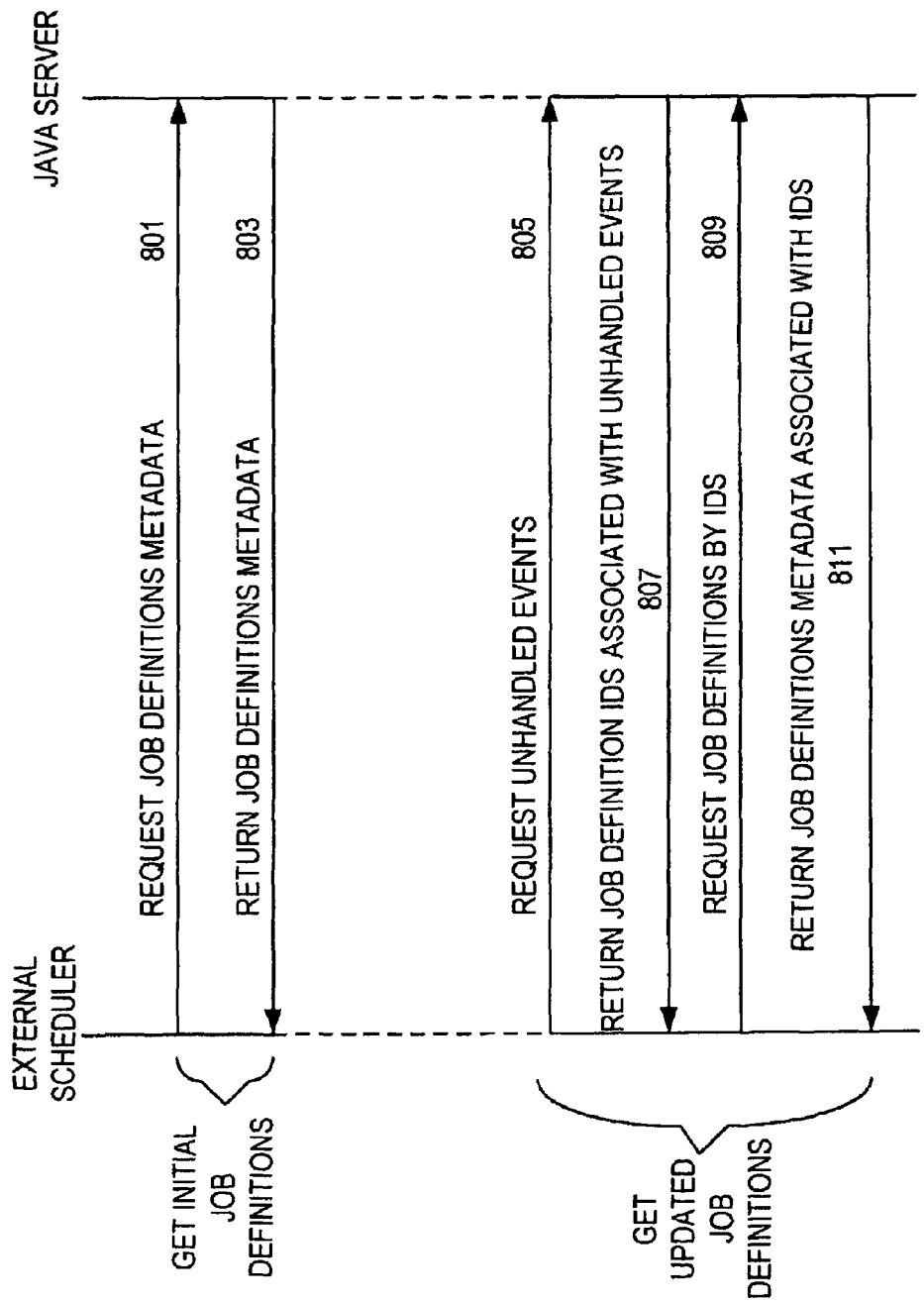
FIG. 8 illustrates a flow for discovering jobs that are on a remote server or computer.

FIG. 8 illustrates an embodiment of a flow for an enterprise scheduler discovering job definitions at a remote server. If the enterprise scheduler does not know what job definitions are deployed at the remote server, the enterprise scheduler should acquire an initial listing of job definitions supported by the remote server. The enterprise scheduler requests the job definitions metadata from the remote server at 801. The remote server returns this metadata to the enterprise scheduler at 803.

According to an embodiment, the job definitions metadata is first serialized and then returned by the remote server. The enterprise scheduler then deserializes the metadata to get a useable copy of the job definitions metadata. Of course, the external server may also be locally provided with a copy of the job definitions without having to query the remote server. However, using this approach may result in not getting the most up-to-date job definitions.

Job definitions available at a remote server may change over time. New job definitions may be added, existing definitions removed or altered, etc. Because of these changes, the enterprise scheduler should be updated to have current definitions. This updating may be scheduled to occur at a particular point in time or be performed on demand.

To update the available job definitions, the enterprise scheduler requests that the remote server alert it of any job definitions that have "unhandled events" such as deployment (new job definitions added), alterations (job definitions changing), removal, etc. at 805. The following description requires that the enterprise scheduler has registered for the new job definitions added and job definition removed events (a job definition updated scenario is mapped to a job definition removed followed by a job definition added event). The remote server returns a listing of events which have not yet been processed by the enterprise scheduler at 807. If there have been deploy or undeploy operations, the list of returned events will contain corresponding events for the deploy/undeploy operations. The deploy/undeploy events do contain the id of the changed job definitions, so the enterprise scheduler can request them 809 or delete it from its repository in case it has been removed from the remote server.

The enterprise scheduler requests job definitions metadata at 809 from the remote server using the job definition IDs returned at 807. The enterprise scheduler may make several requests for job definitions associated with unhandled events at 805 and receive several job definition IDs at 807 prior to the request for job definitions at 809. In essence, the enterprise scheduler may create a batch of job definitions to acquire from the remote server.

The remote server returns job definitions metadata in response to the request for them at 811. The enterprise scheduler then updates its listing of available job definitions.

In an embodiment, instead of getting updated job definitions, the enterprise scheduler simply requests all job definitions in the same manner as the request for job definitions at 801, however, some problems exist with this approach such as too much data may need to be transferred, there is a danger of outdated job definitions being used, etc.

Of course, the external server may also be locally provided with a copy of the job definitions without having to query the remote server. However, using this approach may result in not getting the most up-to-date job definitions.

Figure 9:
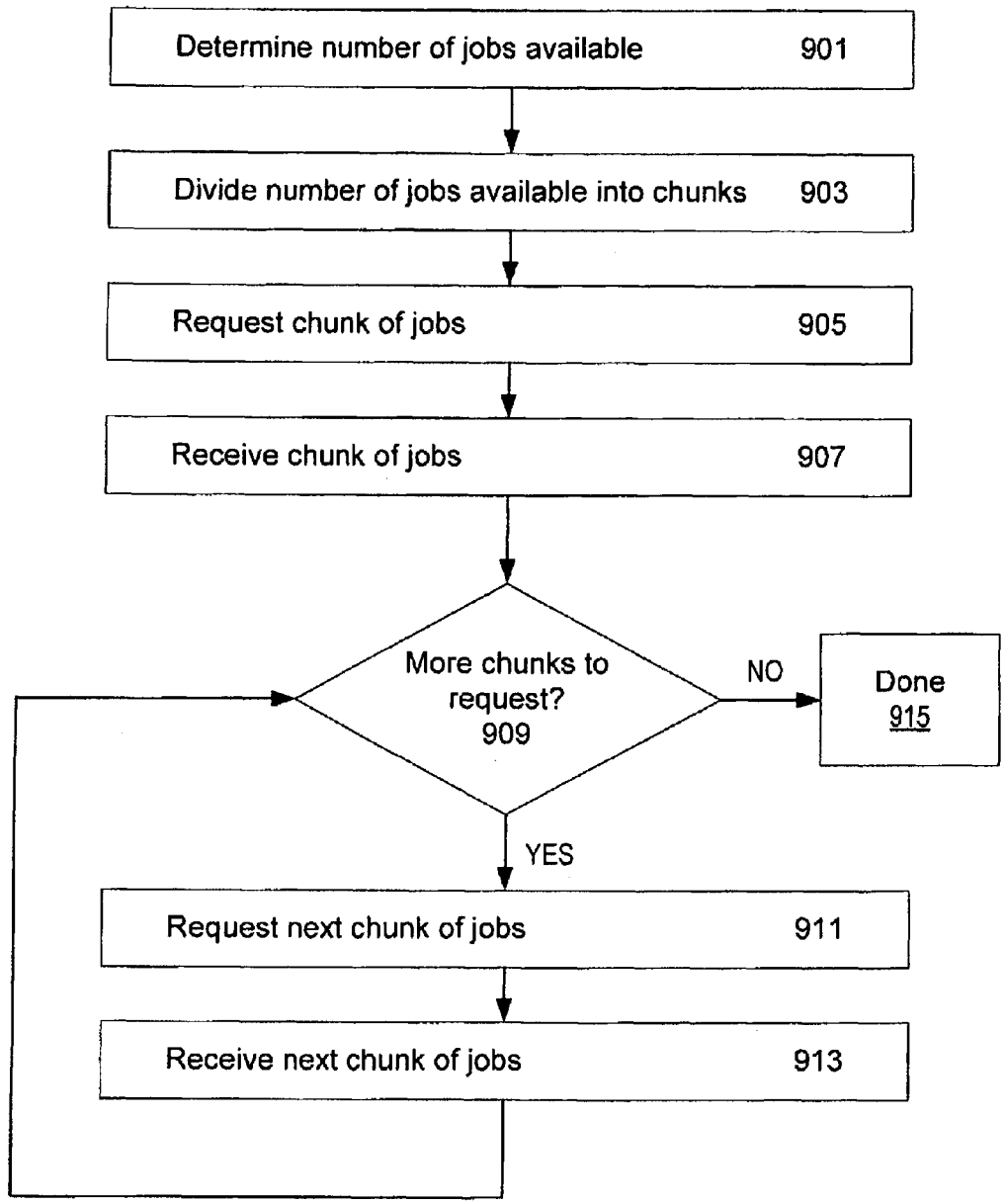
FIG. 9 illustrates an embodiment of a flow for an enterprise scheduler discovering information about jobs scheduled by it on a remote server.

FIG. 9 illustrates an embodiment of a flow for an enterprise scheduler discovering information (such as job status, etc.) about jobs scheduled by it on a remote server. The enterprise scheduler determines the number of jobs that it scheduled on the remote server at 901. This determination may be made in several different ways. If the enterprise scheduler has maintained a listing of jobs available for review (those that it scheduled) on the remote server, then the number of jobs available at the remote server is the number of jobs in the listing. If the enterprise scheduler has not maintained a listing of jobs that scheduled on the remote server, the enterprise scheduler queries the remote server for a count of jobs that it scheduled. As described earlier, the listing of jobs is filterable by enterprise scheduler ID.

If the number of jobs is deemed too large, then the number of jobs is divided into smaller chunks at 903. For example, if several hundred jobs are available for review and retrieving the information associated with those jobs would either tie up too many resources (such as the bandwidth between the enterprise scheduler and the remote server) or be difficult to manage, then only a portion of the jobs is viewed/transferred at a time.

The first chunk of jobs is requested at 905 by the enterprise scheduler and received by it at 907. A determination of if there are more job chunks to request is made at 909. If there are no more chunks then the enterprise scheduler will have received all of the jobs available at the remote server.

If there are more chunks, the enterprise scheduler requests the next chunk at 911 and receives the chunk at 913. This process of determining if there is another chunk to retrieve, requesting and receiving that additional chunk is repeated until the enterprise scheduler has all of the jobs available.

Of course, it should be understood that a scheduler local to the remote server may also retrieve job information in a similar manner (i.e., retrieve the information in chunks). Additionally, a similar chunk based technique (i.e., break request into chunks and ask for and receive only a chunk at a time) may by used by an external or local scheduler to get job logs, job definitions, etc.

Figure 10:
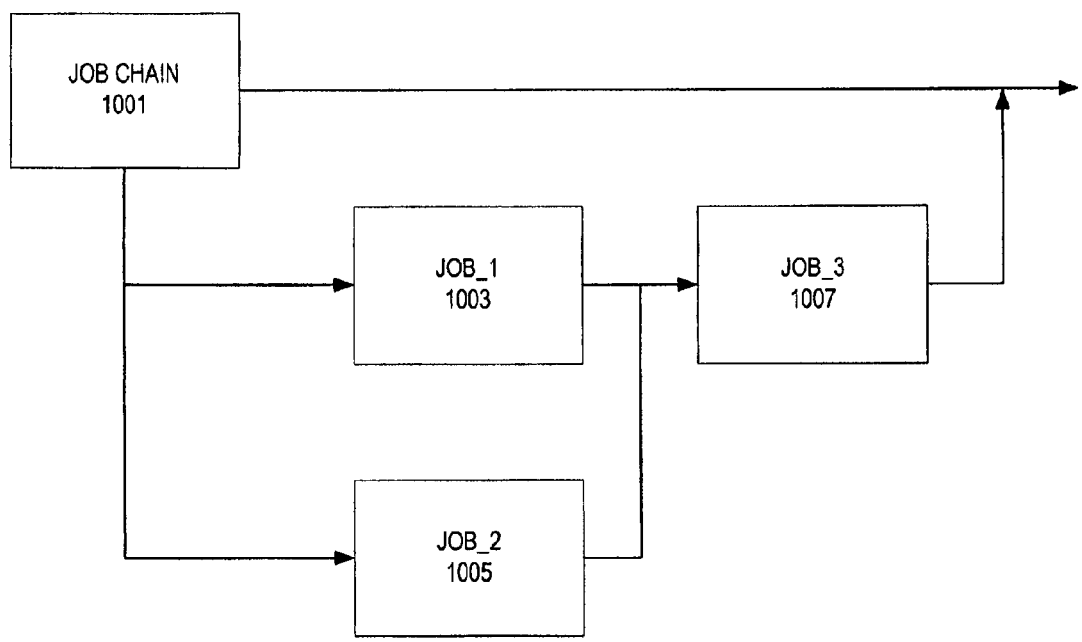
FIG. 10 illustrates an example of a job chain.

Multiple jobs may be scheduled to run sequentially or in parallel in one or more components on the remote server as a job chain. FIG. 10 illustrates an example of a job chain. Job chain 1001 consists of three jobs that are to be performed. Job_1 1003 and job_2 1005 are the first step in the job chain 1001. These two jobs are scheduled to run in parallel. When these two jobs have completed job_3 1007 will run. Jobs may not be able to be performed in parallel for several reasons including, but not limited to: data dependence and available components to run the jobs. When job_3 1007 has been completed the job chain 1001 will have finished.

Figure 11:
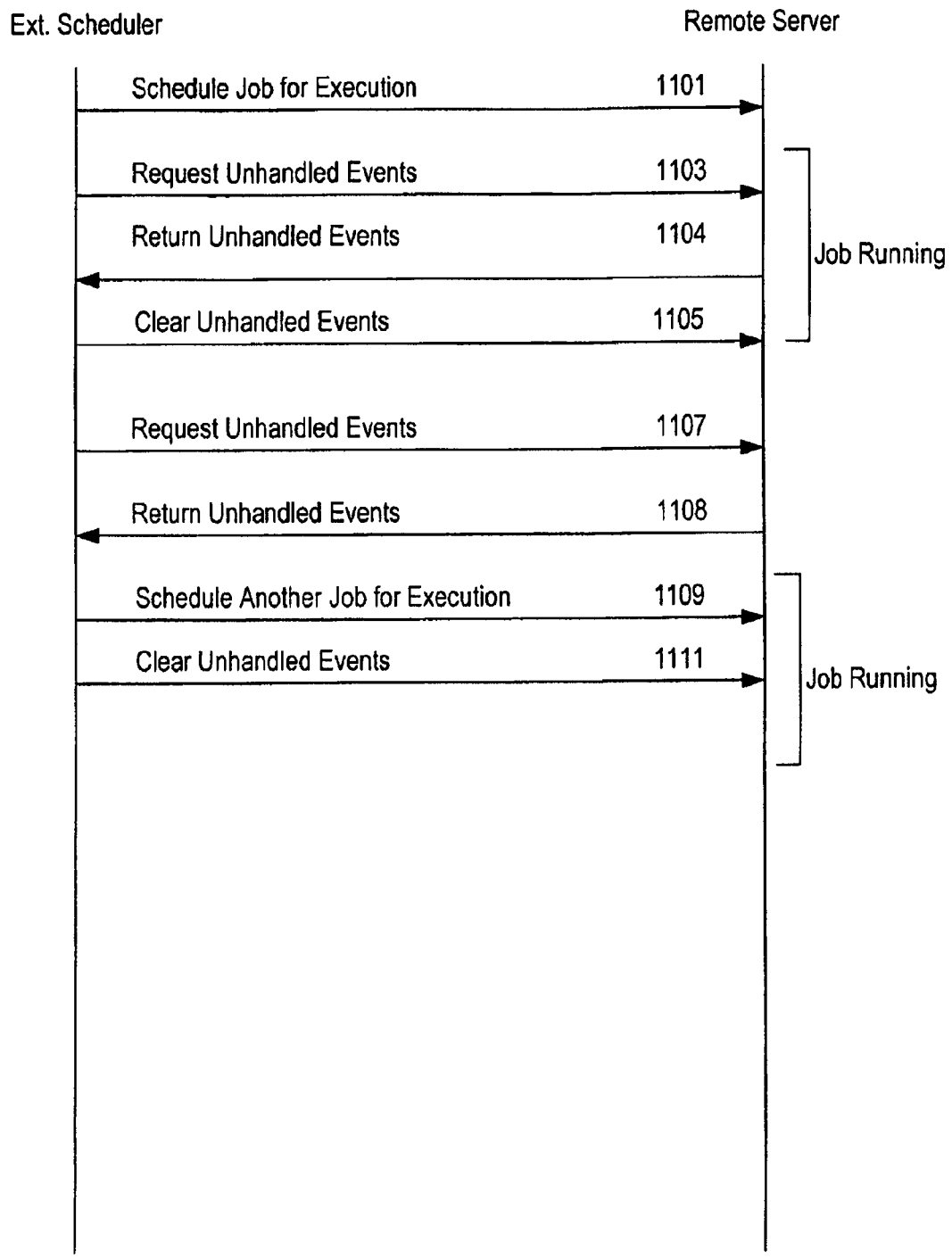
FIG. 11 illustrates an exemplary flow for handling events associated with a job chain.

FIG. 11 illustrates an exemplary flow for handling events associated with a job chain. The external scheduler schedules a job for execution at 1101. As described earlier, scheduling a job in part consists of providing concrete information to the appropriate job definition. While the job is running the external scheduler may request the unhandled events at the remote server at 1103. These unhandled events are returned at 1104. One of the unhandled events may be an indication that the job has started and is executing. After receiving the unhandled events the external scheduler sends a command to the remote server to clear the unhandled events that it returned at 1104 as these events are now considered handled at 1105.

At some point after the scheduled job completes, the external server may again request the unhandled events at the remote server at 1107. These unhandled events are returned at 1108. One of the unhandled events may be an indication that the job has completed.

The external scheduler schedules a second job for execution at 1109. Before or during the execution of the second job, the external scheduler sends a command at 1111 to the remote server to clear the unhandled events that it returned at 1108 as these events are now considered handled.

The external scheduler may continue to request unhandled events and commands to clear the unhandled events that it receives information for including the unhandled events associated with the completion of the second job.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
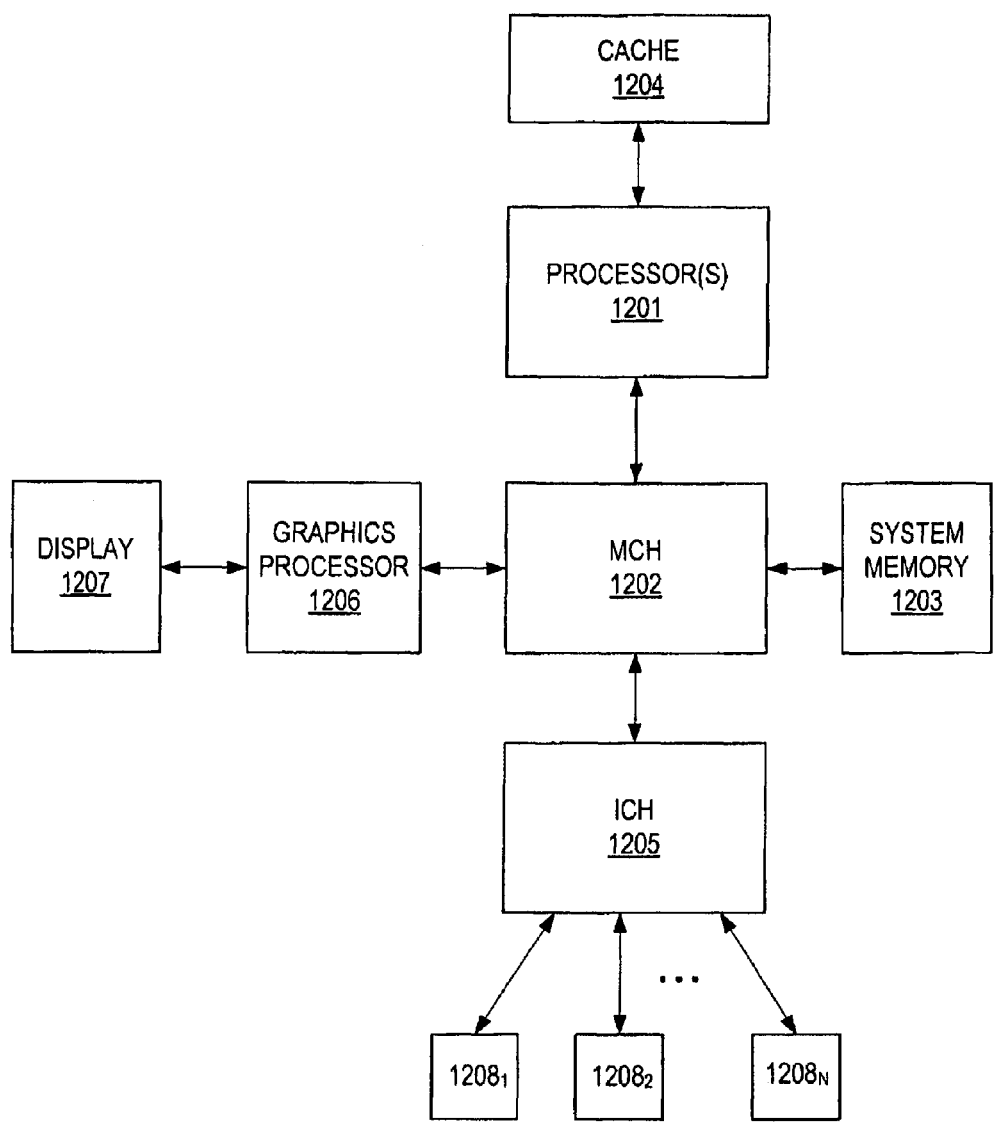
FIG. 12 shows an embodiment of a computing system.

FIG. 12 shows an embodiment of a computing system (e.g., a computer). The exemplary computing system of FIG. 12 includes: 1) one or more processors 1201; 2) a memory control hub (MCH) 1202; 3) a system memory 1203 (of which different types exist such as DDR RAM, EDO RAM, etc,); 4) a cache 1204; 5) an I/O control hub (ICH) 1205; 6) a graphics processor 1206; 7) a display/screen 1207 (of which different types exist such as Cathode Ray Tube (CRT), Thin Film Transistor (TFT), Liquid Crystal Display (LCD), DPL, etc.; 8) one or more I/O devices 1208.

The one or more processors 1201 execute instructions in order to perform whatever software routines the computing system implements. The instructions frequently involve some sort of operation performed upon data. Both data and instructions are stored in system memory 1203 and cache 1204.

Cache 1204 is typically designed to have shorter latency times than system memory 1203. For example, cache 1004 might be integrated onto the same silicon chip(s) as the processor(s) and/or constructed with faster SRAM cells whilst system memory 1203 might be constructed with slower DRAM cells. By tending to store more frequently used instructions and data in the cache 1204 as opposed to the system memory 1203, the overall performance efficiency of the computing system improves.

System memory 1203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1203 prior to their being operated upon by the one or more processor(s) 1201 in the implementation of a software program. Similarly, data that a software program determines should be sent from the computing system to an outside entity through one of the computing system interfaces, or stored into an internal storage element, is often temporarily queued in system memory 1203 prior to its being transmitted or stored.

The ICH 1205 is responsible for ensuring that such data is properly passed between the system memory 1203 and its appropriate corresponding computing system interface (and internal storage device if the computing system is so designed). The MCH 1002 is responsible for managing the various contending requests for system memory 1003 access amongst the processor(s) 1201, interfaces and internal storage elements that may proximately arise in time with respect to one another.

One or more I/O devices 1208 are also implemented in a typical computing system. I/O devices generally are responsible for transferring data to and/or from the computing system (e.g., a networking adapter); or, for large scale non-volatile storage within the computing system (e.g., hard disk drive). ICH 1205 has bi-directional point-to-point links between itself and the observed I/O devices 1208.

In the foregoing specification, the invention has been described with reference to specific exemplary embodiments thereof. It will, however, be evident that various modifications and changes may be made thereto without departing from the broader spirit and scope of the invention as set forth in the appended claims. For example, while the above description refers to a remote server, other configurations such as clusters of computers or non-servers may have jobs remotely scheduled through an API. Additionally, while the enterprise scheduler is illustrated as being stand-alone, it may be a program run on a computing system such as a server or normal personal computer. The specification and drawings are, accordingly, to be regarded in an illustrative rather than a restrictive sense.

I claim:

1. An enterprise scheduler, comprising:
a job definitions listing to store job definitions for a remote system available to the enterprise scheduler, each of the job definitions originating from the remote system and comprising a metadata representation of properties of a task performable on the remote system;
scheduling logic to retrieve the job definitions from the remote system, and to store the job definitions locally in the job definitions listing; and
a jobs listing coupled to the scheduling logic, the jobs listing to store jobs scheduled for execution on the remote system, the scheduling logic to schedule jobs for execution on the remote system using the job definitions by specifying values received from a user for the properties represented by the job definitions, the jobs scheduled for execution on the remote system being stored in the jobs listing, and the scheduling logic to retrieve from the remote system a status of a job scheduled for execution on the remote system.

2. The enterprise scheduler of claim 1, the scheduling logic to:

schedule a first job of the jobs in the jobs listing for execution on the remote system;

retrieve a status of the first job from the remote system;

in response to the status of the first job indicating completion of the first job, schedule a second job of the jobs in the jobs listing for execution on the remote system.

3. The enterprise scheduler of claim 1, further comprising:

a graphical user interface (GUI) coupled to the scheduling logic, the GUI to present a scheduling logic interface to a user, the GUI to receive the values for the properties from the user.

4. The enterprise scheduler of claim 3, the GUI to provide user-accessible links to cause the scheduling logic to:

schedule the jobs on the remote system; and list statuses received from the remote system of the jobs scheduled on the remote system.

5. The enterprise scheduler of claim 1, wherein the remote system comprises a JAVA server.

6. The enterprise scheduler of claim 5, further comprising:

an Application Programming Interface (API) coupled to the scheduling logic, the API to translate communications sent between the scheduling logic and the JAVA server.

7. A system comprising:

a remote system to provide job definitions and to perform scheduled jobs based on the job definitions, each of the job definitions comprising a metadata representation of properties of a task performable on the remote system; and an external scheduler external to the remote system, the external scheduler comprising scheduling logic to retrieve the job definitions from the remote system, to schedule jobs for execution on the remote system by specifying values received from a user for the properties represented by the job definitions, and to retrieve events generated in the remote system that are related to a status of the scheduled jobs.

8. The system of claim 7, the scheduling logic to:

retrieve events for new, changed, and removed job definitions from the remote system;

alter in the external scheduler the job definitions previously retrieved from the remote system based on the events for the changed job definitions;

remove from the external scheduler the job definitions previously retrieved from the remote system based on the events for the removed job definitions; and add to the external scheduler the new job definitions based on the events for the new job definitions.

9. The system of claim 7, the scheduling logic to:

schedule a first job of the jobs to be scheduled for execution on the remote system;

retrieve a status of the first job from the remote system;

in response to the status of the first job indicating completion of the first job, schedule a second job of the jobs to be scheduled for execution on the remote system.

10. The system of claim 7, the external scheduler further comprising:

a graphical user interface (GUI) coupled to the scheduling logic, the GUI to present a scheduling logic interface to a user, the GUI to receive the values of the properties from the user.

11. The system of claim 10, the GUI to provide user-accessible links to cause the scheduling logic to:

schedule the jobs on the remote system; and list statuses received from the remote system of the jobs scheduled on the remote system.

12. The system of claim 7, wherein the remote system comprises a JAVA server.

13. The system of claim 12, the external scheduler further comprising:

an Application Programming Interface (API) coupled to the scheduling logic, the API to translate communications sent between the scheduling logic and the JAVA server.

14. A method comprising:

acquiring from a remote system job definitions deployed in the remote system, each of the job definitions comprising a metadata representation of properties of a task performable on the remote system;

scheduling jobs for execution on the remote system based on the acquired job definitions by specifying values received from a user for the properties represented by the acquired job definitions; and retrieving from the remote system a status of a job scheduled for execution on the remote system.

15. The method of claim 14, wherein the acquiring of the job definitions comprises:

requesting job definitions metadata from the remote system; and receiving the job definitions metadata from the remote system in response to the requesting.

16. The method of claim 15, further comprising:

requesting unhandled events from the remote system, wherein the unhandled events comprise changes, additions, and deletions regarding the job definitions deployed in the remote system;

receiving the requested unhandled events from the remote system, wherein at least one of the unhandled events comprises a job definition identifier;

requesting a job definition associated with the job definition identifier received; and receiving the requested job definition.

17. The method of claim 14, wherein specifying the values for the properties comprises:

modifying at least one of the values for the properties of a previously scheduled job.

* * * * *